US009394955B2

(12) United States Patent
Huschenhoefer et al.

(10) Patent No.: US 9,394,955 B2
(45) Date of Patent: Jul. 19, 2016

(54) BRAKE DISK

(71) Applicant: Robert Bosch GmbH, Stuttgart (DE)

(72) Inventors: Wolfgang Huschenhoefer, Asslar (DE); Georg Ketteler, Dautphetal (DE); Roland Raab, Wiesloch (DE); Vincent Dupuis, Stuttgart (DE); Olivier Bugada, Ostfildern-Kemnat (DE); Hagen Kuckert, Bietigheim-Bissingen (DE); Andreas Mayer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 13/712,560

(22) Filed: Dec. 12, 2012

(65) Prior Publication Data

US 2013/0161137 A1 Jun. 27, 2013

(30) Foreign Application Priority Data

Dec. 27, 2011 (DE) ........................ 10 2011 089 918

(51) Int. Cl.
*F16D 65/10* (2006.01)
*F16D 65/12* (2006.01)

(52) U.S. Cl.
CPC .............. *F16D 65/127* (2013.01); *F16D 65/12* (2013.01); *F16D 65/125* (2013.01); *F16D 2200/006* (2013.01); *F16D 2200/0013* (2013.01); *F16D 2250/0046* (2013.01)

(58) Field of Classification Search
USPC .................................... 188/218 XL; 428/450
See application file for complete search history.

(56) References Cited

U.S. PATENT DOCUMENTS

| | | | | |
|---|---|---|---|---|
| 2,678,118 | A * | 5/1954 | Zenner | 192/75 |
| 3,375,181 | A * | 3/1968 | Koech | 216/11 |
| 3,932,228 | A * | 1/1976 | Sugiyama et al. | 123/193.2 |
| 5,339,931 | A * | 8/1994 | Jacko et al. | 188/251 M |
| 5,407,035 | A * | 4/1995 | Cole et al. | 188/218 XL |
| 6,302,246 | B1 * | 10/2001 | Naumann et al. | 188/218 XL |
| 6,821,447 | B1 * | 11/2004 | Storstein et al. | 216/11 |
| 7,097,780 | B1 * | 8/2006 | Fujita | 216/52 |
| 2009/0026025 | A1 * | 1/2009 | Hampton | 188/218 XL |
| 2009/0317642 | A1 * | 12/2009 | Goller et al. | 428/450 |
| 2010/0219027 | A1 * | 9/2010 | Tsujimi et al. | 188/72.4 |
| 2013/0153345 | A1 * | 6/2013 | Kuckert et al. | 188/218 XL |

* cited by examiner

*Primary Examiner* — Christopher Schwartz
(74) *Attorney, Agent, or Firm* — Maginot, Moore & Beck LLP

(57) ABSTRACT

A gray cast iron brake disk has a thermally applied wear-reducing surface coating containing chromium and/or tungsten carbides. The surface coating has a roughness reduced to about 0.5 to 1 μm to shorten a wearing-in period.

8 Claims, 1 Drawing Sheet

1
3
4, 5
2
6
5
7
1, 2

BRAKE DISK

This application claims priority under 35 U.S.C. §119 to patent application no. DE 10 2011 089 918.9, filed on Dec. 27, 2011 in Germany, the disclosure of which is incorporated herein by reference in its entirety.

BACKGROUND

The disclosure relates to a brake disk, the friction surface of which has a surface coating, having the features described below.

Brake disks for disk brakes of motor vehicles are known. Typically, they are composed of metal, usually of gray cast iron, i.e. of cast iron containing graphite flakes, and typically also of steel. Also known are brake disks made of carbon fiber-reinforced plastic, these being used in motorsport because of their low weight and being restricted essentially to motorsport because of their high wear.

To reduce wear, a wear-reducing surface coating on friction surfaces of the brake disk is known, especially in the case of brake disks made of gray cast iron. Friction surfaces are the brake disk surfaces in the form of perforated circular disks against which the friction brake linings are pressed during braking.

Known wear-reducing surface coatings contain particles of chromium carbide and/or tungsten carbide, i.e. metal-like carbides. The carbide particles are embedded in a metallic matrix composed of nickel or cobalt, for example. The surface coating is applied by thermal spraying, e.g. flame spraying or arc spraying.

As already mentioned, the surface coating increases the wear resistance of the brake disk, which is a desirable effect. At the same time, the surface coating prolongs the wearing-in period of the brake disk owing to its relatively high wear resistance in comparison with the uncoated brake disk. In the case of a new brake disk, wear during braking alters the braking properties, in particular a friction coefficient of the brake disk. After a certain period, the wearing-in period, or after a certain number of braking operations or a certain initial wear, the brake disk reaches a stable state, and its braking properties, in particular its friction coefficient, no longer change or at least change only insignificantly or not noticeably. In order to give a driver a feeling of safety when braking, the wearing-in period should be as short as possible, i.e. a brake disk should exhibit its stable braking state after as few braking operations as possible. Uncoated gray cast iron brake disks reach the stable state after about 30 normal braking operations in road traffic, for example, that is to say not very gentle and also not excessively strong braking operations. Tests have shown that brake disks with a wear-reducing surface coating on the friction surfaces thereof have still not reached the stable state after 120 braking operations, i.e. four times the number of braking operations.

SUMMARY

The brake disk according to the disclosure, having the features described below, has a surface coating with a reduced roughness of less than 2 μm, this being the averaged peak to valley height $R_z$. Typical known wear-reducing surface coatings for brake disks have a roughness of about 8 μm, while, in the case of very smooth surface coatings, it is still 4 μm or more. Tests have shown that surface coatings of relatively low roughness shorten the wearing-in period until the brake disk has stable braking properties. In the case of an averaged peak to valley height $R_z$ of the surface coating of a brake disk of about 1 μm, the brake disk achieves stable braking properties after about 120 braking operations, and thus the roughness of less than 2 μm indicated in the below description is still high, with a roughness of about 1 μm and less being preferred. It has been found that an averaged peak to valley height $R_z$ of the surface coating of about 0.3 μm results in comparable wearing-in behavior to that for an uncoated brake disk, namely stable braking properties after about 30 braking operations. Therefore, a brake disk having a surface coating on the friction surfaces, the roughness of which is less than 0.5 μm and preferably about 0.3 μm or less is particularly preferred. In the case of a roughness of about 0.5 μm, the surface coating no longer appears matt but has a reflective shine or mirror finish, with a bright mirror finish at a roughness of less than 0.3 μm.

The description below relates to advantageous embodiments and developments of the disclosure.

The surface coating according to the disclosure is provided, in particular, for metal brake disks and, in that case, because of the greater wear on gray cast iron brake disks in comparison with, for example, steel. Another possible application is for brake disks made of fiber-reinforced plastics, in particular carbon fiber-reinforced plastics, the use of which has hitherto been restricted essentially to motorsport, owing to the high wear thereof. By means of a wear-reducing surface coating, the wear resistance of such brake disks could be matched to the wear resistance of surface-coated gray cast iron brake disks, i.e. a brake disk made of carbon fiber-reinforced plastic would have a considerably higher wear resistance by virtue of a wear-reducing surface coating than an uncoated metal brake disk of the kind currently used in motor vehicle construction.

The disclosure is not restricted either to the brake disk materials indicated or to the coating materials indicated or to the indicated method of coating.

BRIEF DESCRIPTION OF THE DRAWINGS

The disclosure is explained in greater detail below with reference to an illustrative embodiment, which is shown in the drawing. In the drawing.

The figures are schematic and partially simplified illustrations for the purpose of understanding and of explaining the disclosure.

DETAILED DESCRIPTION

Figure 1:
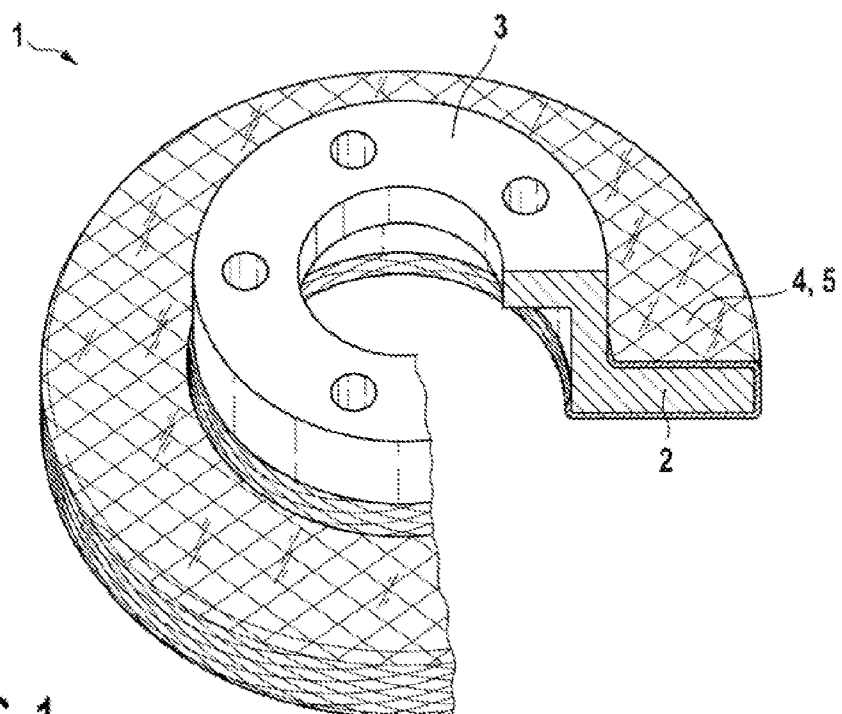
FIG. 1 shows a fragment of a brake disk according to the disclosure in a perspective view.

The brake disk 1 according to the disclosure, which is shown in FIG. 1, has a brake ring 2 in the form of a circular perforated disk and has a hollow-cylindrical cup-shaped hub 3, which is concentric with and integral with the brake ring 2. Faces of the brake ring 2, which are in the form of circular perforated disks, form friction surfaces 4 of the brake disk 1, against which friction brake linings (not shown) of a brake disk (not shown) are pressed for the purpose of braking. The brake disk 1 is provided for use in motor vehicles.

The brake disk 1 is composed of gray cast iron, i.e. of cast-iron containing flakes of graphite. The friction surfaces 4 have a wear-reducing surface coating 5, which, in the illustrative embodiment, is applied thermally by flame spraying or arc spraying. The surface coating 5 covers the friction surfaces 4 and, due to the application method, adjoining areas.

However, it is also possible for the surface coating 5 to cover not only the friction surfaces 4 but also other areas of the surface of the brake disk 1, or even the entire brake disk 1.

The wear-reducing surface coating 5 contains particles of chromium carbide and/or tungsten carbide, that is to say in general metal-like carbides and, more generally, carbides. The carbide particles are embedded in a metallic matrix of nickel or cobalt, for example. Apart from wear resistance, the surface coating 5 increases corrosion resistance and improves the braking properties of the brake disk 1.

Figure 2:
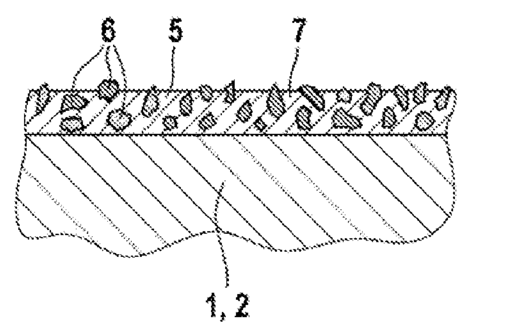
FIG. 2 shows an enlarged sectional view of the prior art.

FIG. 2 shows a schematic sectional view of the brake ring 2 of the brake disk 1 with the thermally applied wear-reducing surface coating 5, which corresponds to the prior art. The carbide particles 6 protrude from the metallic matrix 7, and the surface coating 5 has an averaged peak to valley height $R_z$ of 8 μm. Very smooth surface coatings in the prior art still have an averaged peak to valley height $R_z$ of 4 μm and above.

Figure 3:
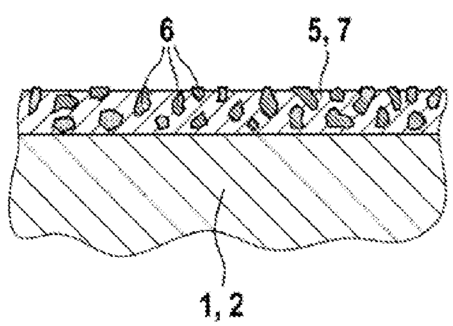
FIG. 3 shows a sectional view of the brake disk according to the disclosure corresponding to FIG. 2.

The surface coating 5 of the friction surfaces 4 of the brake disk 1 according to the disclosure, as can be seen in FIG. 3, is smoother, having an averaged peak to valley height $R_z$ of, preferably, 1 μm or less, with an averaged peak to valley height $R_z$ of about 2 μm being regarded as the upper limit. An averaged peak to valley height of the wear-reducing surface coating 5 of about 0.3 to 0.5 μm is particularly preferred. With this peak to valley height, the surface coating 5 begins to have a mirror effect or even to become specular, as indicated by the hatching in FIG. 1. A peak to valley height of the surface coating 5 of the new, unused brake disk 1 that corresponds to the peak to valley height of the surface coating 5 after an average period of use between the new state and the worn state is desirable per se. This eliminates or shortens a wearing-in period. The braking properties, in particular the friction coefficient, of normal brake disks change from a new state to a worn-in state, after which they change only slightly or impercetibly, if at all. This is what is meant by the wearing-in period, which can also be given as the number of braking operations until stable braking properties are achieved. Because of the low wear of the wear-reducing surface coating 5, the wearing-in period, in particular the number of braking operations required for the brake disk 1 to have stable braking properties, is increased many times over. According to the disclosure, the aim is a roughness of the surface coating 5, even when new, such as the surface coating 5 has on a used brake disk 1, which changes to only a negligible extent, if at all, from the end of the wearing-in period to the worn state of the brake disk 1. In this ideal case, the braking properties of the brake disk 1 according to the disclosure will change to a negligible extent, if at all, from the new state to the worn state, eliminating wearing in. Greater roughness entails wearing in, with the roughness of the wear-reducing surface coating 5 of the friction surfaces 4 of the brake disk 1 being so low that the wearing-in period is acceptable. Given an average peak to valley height $R_z$ of the surface coating 5 in the new state of 1 μm, wearing in takes about 120 braking operations and hence approximately 4 times as long as the wearing in of an uncoated gray cast iron brake disk. Given an average peak to valley height $R_z$ of the surface coating 5 of approximately 0.3 μm, the wearing-in period is shortened to about 30 braking operations, corresponding to the wearing-in period of an uncoated gray cast iron brake disk.

In order to achieve the roughness according to the disclosure, the wear-reducing surface coating 5 of the brake disk 1 according to the disclosure is finish-machined. For example, the surface coating 5 is finely ground, barrel-finished, lapped, honed, ultrasonically ground or ultrasonically lapped. By means of finish machining, which is, in particular, performed by cutting, points and edges of the carbide particles 6 protruding from the matrix 7 of the surface coating 5 are removed, with the result that the carbide particles 6 protrude less far out of the matrix 7 and the protruding parts of the carbide particles 6 are blunter. Even when new, the surface coating 5 has a surface structure and roughness corresponding to or at least approaching that of the surface coating 5 when worn in.

What is claimed is:

1. A brake disk comprising:

a friction surface; and a surface coating on the friction surface, the surface coating including carbide particles projecting from the surface thereof and having a roughness of less than 0.5 μm.

2. The brake disk according to claim 1, wherein the surface coating is formed by finish-machining an initial surface coating to reduce the height of the carbide particles projecting therefrom to said roughness.

3. The brake disk according to claim 1, wherein the surface coating is formed by finely grinding, barrel-finishing, lapping, honing, ultrasonically grinding or ultrasonically lapping an initial surface coating to reduce the height of the carbide particles projecting therefrom to said roughness.

4. The brake disk according to claim 1, wherein the brake disk is composed of gray cast iron or of carbon fiber-reinforced plastic.

5. A brake disk comprising:

a friction surface; and a surface coating on the friction surface, the surface coating including carbide particles projecting from the surface thereof and having a roughness defined by said carbide particles of less than 0.5 μm.

6. The brake disk according to claim 5, wherein the surface coating is formed by finish-machining an initial surface coating to reduce the height of the carbide particles projecting therefrom to said roughness.

7. The brake disk according to claim 5, wherein the surface coating is formed by finely grinding, barrel-finishing, lapping, honing, ultrasonically grinding or ultrasonically lapping an initial surface coating to reduce the height of the carbide particles projecting therefrom to said roughness.

8. The brake disk according to claim 5, wherein the brake disk is composed of gray cast iron or of carbon fiber-reinforced plastic.

* * * * *